UNITED STATES PATENT OFFICE.

ERNST ULRICHS, OF ELBERFELD, GERMANY, ASSIGNOR TO COMPANY WÜLFING DAHL & CO., ACTIENGESELLSCHAFT, FARBENFABRIKEN, OF BARMEN, GERMANY.

PROCESS OF MAKING A RED AZO DYE.

936,260.  Specification of Letters Patent.  Patented Oct. 5, 1909.

No Drawing.  Original application filed March 9, 1909, Serial No. 482,241.  Divided and this application filed July 12, 1909.  Serial No. 507,036.

*To all whom it may concern:*

Be it known that I, ERNST ULRICHS, a subject of the King of Prussia, German Emperor, and resident of Alter Markt of Elberfeld, Province of the Rhine, German Empire, have invented a new and useful Process for the Production of Red Azo Dye, of which the following is a specification.

This invention relates to a process for the production of a red azo-dye which is specially suited for the manufacture of color-lakes.

The present application is divided from the application of Ernst Ulrichs Serial No. 482241 filed March 9th. 1909.

When an azo-dye is produced according to the method described in the United States Patent No. 650757 by coupling naphthylamin-sulfo acid 2.1 and beta-naphthol and then boiling the dye produced after the coupling as prescribed in the above mentioned patent there results the dye known in commerce as lithol-red R. It has now been discovered that the dye before boiling is not identical with the dye after boiling and it would appear that two molecules of the dye before boiling have during the boiling process taken up one molecule of water. The unboiled dye may therefore be assumed to be an anhydrid of the boiled dye. The present applicant has now discovered that this anhydrid which shall be called briefly F-anhydrid, when the coupling is produced at ordinary temperatures and when no boiling takes place after the coupling of the naphthylamin-sulfo acid and the beta-naphthol then the anhydrid very soon takes up water so that in a short time the ordinary lithol-red is formed. He has also discovered that a very permanent F-anhydrid is obtained if the coupling of the sulfo-acid and beta-naphthol is effected at a high temperature either in the presence or absence of neutral salts of the alkalies or ammonium salts. The F-anhydrid produced in this manner may be stored in a doughy form for several months without changing into lithol-red. When boiled however the dye of course takes up water and changes into the form of lithol red.

The following are some particular examples of the method of producing the F-anhydrid according to the present invention.

Example I: 26.3 kg. of the sodium salt of naphthylamin sulfo acid 2.1 are dissolved in 400 liters water at a temperature of 25–30° C. This solution is then mixed with 30 kg. hydrochloric acid of 20° Baumé while stirring and then the whole is diazotized with a solution of 7 kg. sodium nitrite in about 35 liters water. The diazo acid is drawn off and washed with water and then mixed to form a thin paste with 1000 liters water at a temperature of 40° C. in the coupling tank. A warm solution of 14.4 kg. beta-naphthol and 4 kg. caustic soda in about 300 liters water, the solution being at a temperature of about 60° C. is then added and the whole is stirred until the coupling is completed.

Example II: The process is carried out exactly as in Example 1, but 40 liters of a saturated solution of common salt is added to the washed diazo acid in the coupling tank after which the warm beta-naphthol solution is added. In this case the coupling proceeds very much more slowly than in Example 1, but the F-anhydrid produced in this way even when allowed to stand for a very long time does not change over into the usual dye stuff produced from naphthylamin sulfo acid 2.1 and beta-naphthol. The coupling of naphthylamin sulfo acid 2.1 with beta-naphthol may be effected at considerably higher temperatures without disturbing the effect. Further the quantities of water employed may be varied within wide limits.

The F-anhydrid produced according to the present invention gives when boiled with Turkey-red oil or monopol soap and calcium or strontium salts the bluish red lake which is identical with that produced by the dye described in application Serial No. 482241 and Patent Number 911186.

I claim:—

1. Process for the production of a red azo dye suitable for the manufacture of color-lakes consisting in coupling diazo naphthylamin sulfo acid 2.1 with beta-naphthol at a high temperature.

2. Process for the production of a red azo dye suitable for the manufacture of color-lakes, consisting in coupling diazo-naphthylamin sulfo acid 2.1 with beta-naphthol at a high temperature in the presence of a neutral alkaline salt.

In witness whereof I have hereunto set my hand in the presence of two witnesses.

ERNST ULRICHS. [L. S.]

Witnesses:
OTTO KÖNIG,
WILLY KLEIN.